Aug. 14, 1962 R. G. NEIGHORN ET AL 3,048,861
APPARATUS FOR FORMING HOLLOW RIVETS FROM AN ANNULAR BLANK
Filed June 2, 1958 5 Sheets-Sheet 4

INVENTORS
ROY G. NEIGHORN
TOIVO A. OLSON
BY
BUCKHORN, CHEATHAM & BLORE
ATTORNEYS

Aug. 14, 1962     R. G. NEIGHORN ET AL     3,048,861
APPARATUS FOR FORMING HOLLOW RIVETS FROM AN ANNULAR BLANK
Filed June 2, 1958     5 Sheets-Sheet 5

INVENTORS.
ROY G. NEIGHORN
TOIVO A. OLSON
BY
BUCKHORN, CHEATHAM & BLORE
ATTORNEYS

United States Patent Office 3,048,861
Patented Aug. 14, 1962

3,048,861
APPARATUS FOR FORMING HOLLOW RIVETS FROM AN ANNULAR BLANK
Roy G. Neighorn and Toivo A. Olson, Portland, Oreg., assignors to Omark Industries, Inc., Portland, Oreg., a corporation of Oregon
Filed June 2, 1958, Ser. No. 739,157
1 Claim. (Cl. 10—11)

This invention relates to a method and apparatus for forming holow rivets and more particularly to a method and machine for carrying out a method in which an annular blank of extrudable metal is subjected to pressure in an extrusion chamber to cause the metal of the blank to flow into an annular passage of smaller diameter than the blank so as to form a hollow rivet shank and in which such metal is caused to conform to a central die element having portions of progressively smaller diameter in the direction of the flow of the metal being extruded.

In one commercial prior art process of making hollow rivets, the rivet making operation is carried out in one or more heading machines. The stock from which the rivets are formed is a wire or rod of approximately the same diameter as the external diameter of the shank of the resulting rivet. Such stock is cut into blanks of proper length and one end of a blank is upset to form a rivet head after which continued heading machine operations pierce a hole through the shank of the rivet. At least four different heading machine operations are usually required to produce a finished rivet having a head, a shank and a properly shaped internal bore. Unless the metal is annealed between at least certain of such operations, the final operations are difficult to carry out because of hardening of the metal by cold working. In any event, it is difficult and expensive to produce good quality rivets by such process.

A second prior art method is to partially form the hollow rivet in a heading machine, for example, by cutting off a suitable blank and performing one heading machine operation thereon to both form the head of the rivet and indent the ends of the rivet to provide centering marks for a drilling operation. The partially finished rivets are then fed into an automatic drilling machine in which properly shaped drills bore the holes in the rivets. Good quality rivets are produced by such operation without intermediate or final heat treatment but the combined heading machine and drilling operation result in a slow and expensive process.

In accordance with the present invention, annular blanks are formed in a conventional type of punch press operation from strips of extrudable metal. The annular blanks each have an outside diameter which approximates the major diameter of the head of the final rivet and each has a central hole therethrough which approximates the maximum diameter of the internal bore in the final rivet. The thickness of the blank is determined by the length of the desired rivet. That is to say, the thickness of the strip of metal from which the blanks are punched is selected so that the blanks will have sufficient metal therein to form a rivet of desired length. The blanks referred to are employed in the rivet forming process of the present invention.

In forming hollow rivets from the blanks just described, a blank is positioned within an extrusion chamber having opposed end walls one of which is provided by the end wall of a recess in a die member and the other of which is provided by the end of a die member received in such recess. The side walls of the recess form the side walls of the extrusion chamber and one of the end walls of the extrusion chamber has a centrally located cylindrical passage therein leading axially from the extrusion chamber and of smaller diameter than such chamber. The other of the end walls has a central die element extending therefrom through the extrusion chamber into and concentric with such cylindrical passage to provide an annular passage into which metal is extruded from the blank when the two die members are forced toward each other. The form of the head of the rivet is determined by the form of the end walls of the extrusion chamber. The annular passage has an internal diameter corresponding to the external diameter of the shank of the desired rivet. The central die element has an external diameter and shape conforming to the desired internal bore of the rivet. In general, such central die element will have a tapered portion in which the diameter of such element becomes progressively smaller in the direction of flow of the metal being extruded. This means that the annular area of the annular passage becomes progressively greater in the direction of such flow of the metal.

The metal being extruded is caused to conform to the central die member so as to fill the annular passage of progressively greater area. The preferred way of accomplishing this is to upset the extruded metal in the annular passage immediately upon completion of the extrusion and while the extruded metal is still plastic from the extrusion by forcing into the annular passage against the end of the extruded metal the annular end of a forming member which fits the portion of the passage of greatest annular area. Another way is to position such annular end of the forming member in the path of the extruded metal during extrusion thereof to cause the metal being extruded to force the forming member rearwardly in such annular passage. By causing the forming member to yieldingly resist the flow of the metal being extruded such metal is caused to conform to the inner die member.

In any event, after the rivet has thus been formed, the die member having the central die element thereon is withdrawn from the other die member and thereafter the rivet is ejected from the extrusion passage in such other die member by the forming member after which another blank may be positioned in the extrusion chamber and another rivet formed. The rivets are accurately formed and have excellent metallurgical properties and excellent appearance.

It is therefore an object of the present invention to provide an improved method of forming hollow rivets in which the shank of a rivet is extruded from annular blank having a diameter greater than the diameter of such shank.

Another object of the invention is to provide a process and apparatus for forming hollow rivets in which an annular blank having an external diameter approximating that of the head of such a rivet and having an internal diameter approximating that of the bore of the rivet is extruded and a rivet shank formed from the extruded metal in a manner providing an accurately finished rivet having consolidated extruded metal therein.

Another object of the invention is to provide a method and apparatus for forming hollow rivets in which the shank of a rivet being extruded from an annular blank is caused to fill and is consolidated in an annular passage having portions of progressively greater annular area in the direction of flow of the extruded metal.

A further object of the invention is to provide a method and apparatus for forming hollow rivets in which the shank of a rivet is extruded from an annular blank into an annular passage having portions of progressively greater annular area and the metal being extruded is upset in such passage while the metal is still plastic from the extrusion operation in order to consolidate such metal and cause it to fill the annular passage.

A still further object of the invention is to provide a method and apparatus for forming hollow rivets each having an internal bore of reduced diameter spaced from the head of the rivets in which the shank of the rivet is extruded from an annular blank of larger diameter than such shank into an annular passage and the flow of the metal being extruded is retarded during the latter stage of the extrusion to cause it to be diverted into and fill a portion of such passage of increased cross-sectional area.

Other objects and advantages of the invention will appear in the following description of preferred embodiments of the invention shown in the attached drawings of which.

Figures 1, 4, 5, 6, 7, 8:
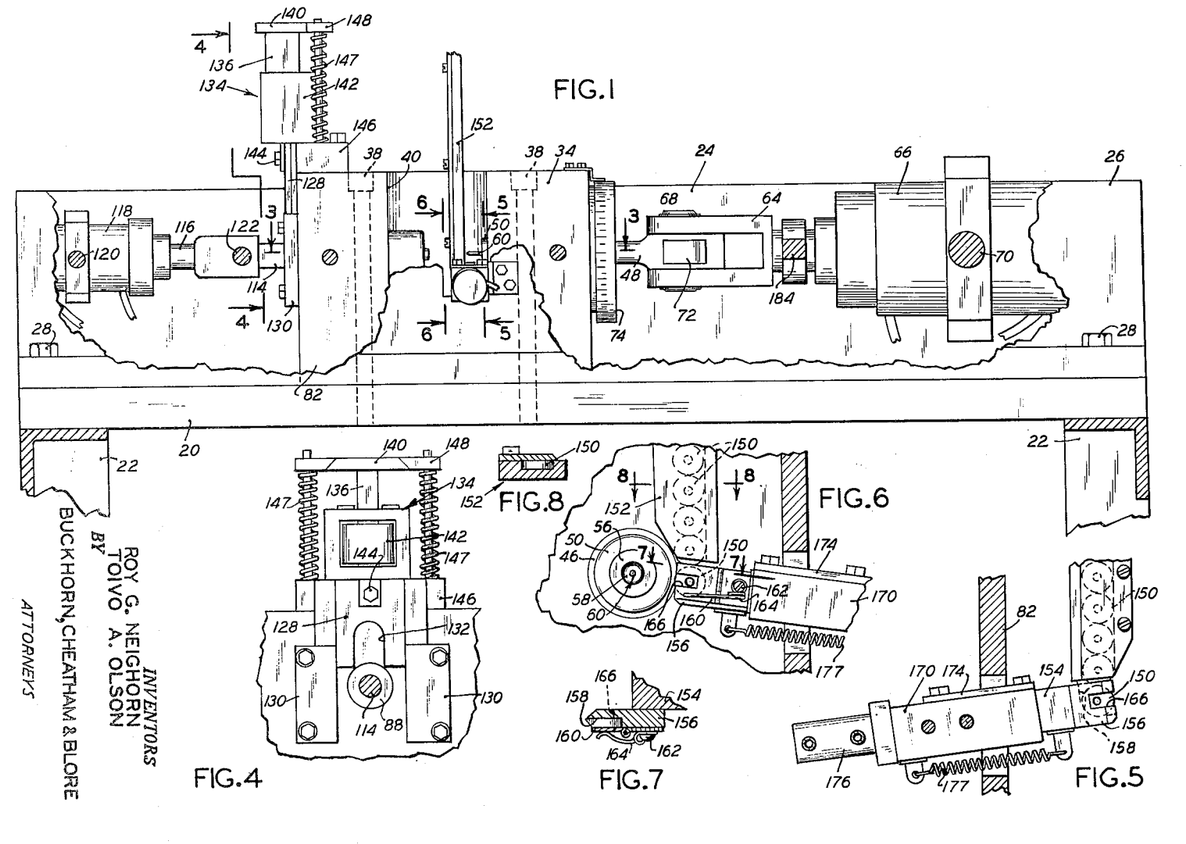
FIG. 1 is a side elevation of one form of a rivet forming apparatus in accordance with the present invention with parts broken away to show elements positioned between the side members of the apparatus.
FIG. 4 is a fragmentary transverse vertical section taken on the line 4—4 of FIG. 1 and showing the forming member stop mechanism.
FIG. 5 is a fragmentary transverse vertical section on an enlarged scale taken on the line 5—5 of FIG. 1 and showing one side of the blank feeding mechanism.
FIG. 6 is also a fragmentary transverse section taken on the line 6—6 of FIG. 1 and showing the other side of the blank feeding mechanism.
FIG. 7 is a fragmentary sectional view taken on the line 7—7 of FIG. 6 and showing the blank carrier of the feeding mechanism.
FIG. 8 is a fragmentary horizontal section taken on the line 8—8 of FIG. 6 and showing the structure of the feed chute.
Figure 2:
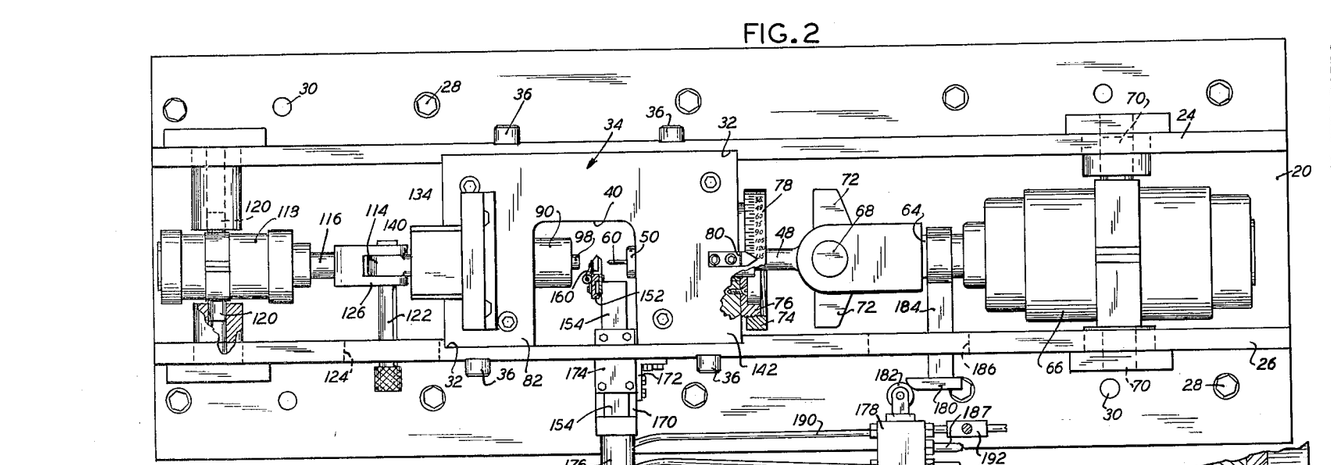
FIG. 2 is a plan view of the apparatus of FIG. 1 with parts broken away to show internal structure.

Referring more particularly to the drawings, the apparatus of FIGS. 1 to 8 includes a bed plate 20 supported upon legs 22 at each end thereof and having upstanding side members 24 and 26 secured thereto. The side members 24 and 26 are of angle form and have their lower flanges secured to the bed plate 20 by the bolts 28 so that the side members extend longitudinally of the bed plate. The side members 26 are held in accurate position by the dowels 30 shown in FIG. 2. The upstanding flanges of the side members 26 are spaced inwardly from the edges of the bed plate 20 and from each other and support the operating elements of the apparatus. As shown in FIG. 2, the side members 26 are notched at 32 to receive a die block 34 of massive construction held in position between the side members 32 by the bolts 36 extending through the side members and also by the bolts 38 threaded into the base plate 20 and shown in dotted lines in FIG. 1. The die block 34 has cut out portion 40 extending vertically along one side thereof and extending laterally of the block a distance which is somewhat greater than half the width of the block. The cut out portion 40 has sufficient width longitudinally of the block to provide room for carrying out the extrusion operation of the present invention within such cut out portion. The resulting die block is U-shaped and has two end portions spaced from each other by the cut out portion 40.

Figure 3:
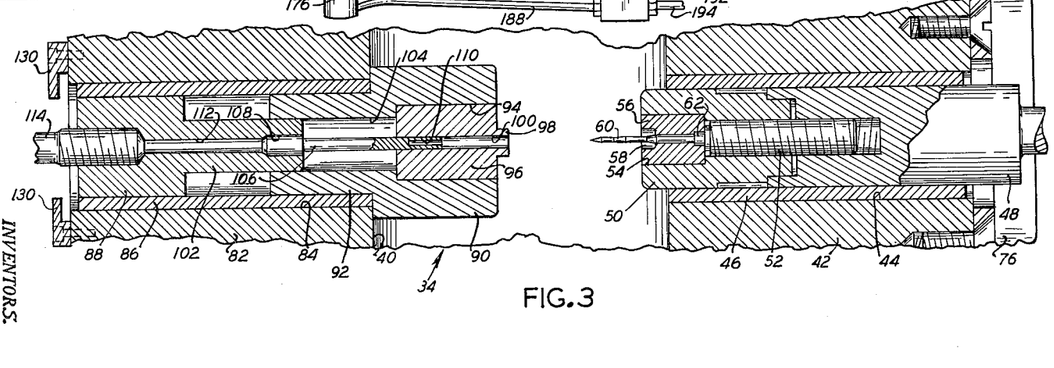
FIG. 3 is a fragmentary horizontal cross section on an enlarged scale taken on the line 3—3 of FIG. 1 and showing the die structure.

As shown in FIG. 3, the end portion 42 of the die block 34 has a bore 44 extending therethrough in axial alignment with the side members 24 and 26 of the apparatus. A sleeve liner 46 is positioned in said bore to provide a bearing for a reciprocating plunger 48. A die holder 50 is attached to the plunger 48 by means of a concentrically positioned axially extending screw 52 and is also reciprocable in and guided by the sleeve 46. The die holder 50 and plunger 48 have interfitting parts concentric with the sleeve 44 so as to be accurately held in alignment with each other and the free end of the die holder 50 projects into the cut out portion 40 of the die block 34. The die holder 50 has a cylindrical socket 54 concentrically disposed in its free end in which a die member 56 is positioned. The die member 56 has a concentric cylindrical recess 58 in its free end and a circular central die element 60 extends concentrically through the die member 56 and has its head 62 bearing against the end of the screw 52. The screw 52 thus functions as a backing element for the central die element 60.

The plunger 48 is connected at its end remote from the die holder 50 to a piston rod 64 of a hydraulic cylinder 66 by means of a pivot 68. The cylinder 66 is mounted on trunnions 70 in suitable bearing members in the side members 24 and 26. Any misalignment between the cylinder 66 and the sleeve 46 is compensated for by pivotal action about the pivot 68 and the trunnions 70.

The die plunger 48 has a pair of transversely extending portions 72 adjacent the pivot 68 which are positioned to engage an annular stop member 74 screw-threaded upon a cylindrical member 76 secured to the end portion 42 of the die block 34. The thread between the stop member 74 and the cylindrical member 76 is preferably a micrometer thread and the periphery of the annular stop member 74 may have graduations 78 thereon cooperating with an index member 80 secured to the die block 34 to indicate the relative longitudinal position of the stop member 74 with respect to the die block 34. It will be apparent that the end of the stroke of the die plunger 48 toward the die block 34 may be predetermined by setting the stop member 74. Engagement of the transversely extending portions 72 with the stop member 74 will limit the movement of the die plunger 48 and die holder 50 carried thereby to the left in such figures.

The other end portion 82 of the die block 34 also has a bore 84 therein in alignment with the bore 44 of the end portion 42 of the die block. The bore 84 also has therein a bearing sleeve 86 which receives a cylindrical plunger 88 for longitudinal reciprocation in the sleeve. A die holder 90 is positioned at the other end of the sleeve and has an end projecting into the cut out portion 40 of the die block 34. The die holder 90 has a reduced portion 92 which fits within the sleeve 86 and the remainder of the die holder 90 has a shoulder which bears against the surface of the die block 34 within the cutout portion 40. The die holder 90 has a cylindrical socket 94 in its free end in which is positioned a cylindrical die member 96 having a cylindrical projection or die plunger 98 which is concentric with the die member 96 and which is in alignment with and fits the reces 58 in the die member 56 held in the die holder 50 in the other end portion 42 of the die block 34. The die member 96 has a concentric bore 100 of uniform diameter therein, which diameter is larger than the diameter of the projecting portion of the central die element 60 held in the die member 56.

The plunger 88 has a cylindrical concentric portion 102 of reduced diameter which fits in a cylindrical bore 104 in the die holder 90. The bore 104 is of lesser diameter than the bore 94 in the die holder 90 but of greater diameter than the bore 100 in the die member 96. A forming member 106, which contitutes an upsetting member or alternatively a flow retarder for the metal being extruded, has one end received in and fitting the bore 100 in the die member 96 and an enlarged head on its other end received in a socket 108 in the reduced portion 102 of the plunger 88. It will be apparent that the plunger 88 may be reciprocated axially in the sleeve 86 with respect to the die holder 90 and die member 96 to reciprocate the forming member 106 in the bore 100 in the die member 96. The forming member 106 has a concentric cylindrical bore 110 in its free end which has an internal diameter fitting the free end portion of the central die elements 60 carried by the die member 56.

The plunger 88 has a bore 112 therein of smaller diameter than the bore 108. The bore 112 extends longitudinally of the plunger 88 to enable the forming member 106 to be removed from the bore 108 in the plunger by inserting a suitable punch through the bore 112. A connecting member 114 is screw-threaded into the end of the plunger 88 opposite the bore 108 therein. The connecting member 114 is connected to a piston rod 116 of a hydraulic cylinder 118. The cylinder 118 is mounted on trunnions 120 received in suitable bearing members mounted in the side members 24 and 26 and the connection between the connecting member 114 and the piston rod 116 is a pivot 122, such that the trunnions 120 and pivot 122 compensate for any misalignment between the cylinder 118 and the bearing sleeve 86. The pivot 122 between the connecting element 114 and the piston rod 116 extends laterally of the apparatus through a guide slot 124 indicated by dotted lines in FIG. 2 to prevent rotation of the piston rod 116.

A stop mechanism is provided for limiting the travel of the piston rod 116 of the cylinder 118 and element associated with such piston rod toward the die block 34. The piston rod 116 has a clevis portion 126 forming part of the pivotal connection between the piston rod and the connecting member 114 and the ends of said clevis portion 126 adajcent the die block 34 are adapted to engage a stop member 128 mounted on the die block, as shown most clearly in FIGS. 1 and 4. Such step member is reciprocable vertically between guide members 130 secured to the end portion 82 of the die block 34. The reciprocable stop member 128 has a notch 132 in its lower end which provides clearance for the connecting member 114 when the stop member 128 is in its lowermost position. The stop member 128 may be reciprocated between its uppermost or inactive position shown in FIGS. 1 and 4 and a lower stop position by means of a solenoid 134 having a plunger 136 and an armature 140 as well as a winding 142. Upon energization of the winding 142, the plunger 136 is pulled downwardly. Such plunger has a lower extension connected to the stop member 128 by a screw 144. The solenoid 134 is mounted upon a base plate 146 secured to the upper surface of the die block 34 and compression springs 147 between such plate and a laterally extending member 148 secured to the armature 140 return the plunger to its uppermost position to carry the stop member 128 upwardly when the winding 142 of the solenoid is deenergized.

When the stop member 128 is in its lowermost position, it is engaged by the ends of the clevis member 126 of the piston rod 116 to stop the motion of the piston rod and the forming member 106 connected thereto through the connecting member 114 and plunger 88. Thus the forming member 106 is stopped at a predetermined position in its travel toward the die member 56 and central die element 58 carried by the die member 56. When the stop member 128 is in its uppermost position, the piston rod 116 can be reciprocated sufficiently to the right to project the forming member 106 a short distance from the die member 96 to discharge a rivet from the die member 96. The control mechanism is such that the piston rod 116 is stopped by the stop member 128 for alternate strokes of the piston rod 116 toward the die block 34 and is allowed to travel to the end of its stroke on the other alternate strokes. By substituting stop members 128 of different thicknesses, the position reached by the forming member 106 in the die member 96 can be accurately predetermined.

A feeding mechanism is provided for feeding annular blanks into position to be impaled upon the central die element 60 as the die holder 50 and die member 56 are moved to the left in FIGS. 1 and 2 at the start of a rivet forming operation. The blanks 150, also shown in FIGS. 5 and 6, are fed downwardly in a covered chute 152 from any suitable or known type of blank orienting and supply mechanism. Such mechanism may be of any known or suitable type, such as a conventional rotating or vibrating chute supply magazine. As shown in FIGS. 1 and 2, the chute 152 has its lower end extending vertically downwardly into the cut out portion 40 in the block 34 to a position adjacent but spaced laterally from the central die element 60. A reciprocating feeding member 154 has a blank carrier 156 secured thereto and positioned directly below the lower end of the chute 152. Thank blank carrier 156 has a recess 158 therein conforming generally to the shape of a blank 150. The recess 158 has an open top and side, the open side of the recess being closed by a hinged element 160 secured to the blank carrier 156 by a screw 162. A spring 164 held by the screw 162 holds the hinged element 160 in a position closing the side of the recess 158. The recess 158 is positioned to receive a blank 150 through the open top from the chute 152 when the feeding member 154 is in its retracted position shown in FIGS. 5 and 6. The blank carrier 156 and its hinged element 160 have aligned slots 166 therein which are also in alignment with the aperture through an annular blank 150 in the recess. It will be apparent from the FIG. 6 that reciprocation of the feeding member 154 to the left from the position shown in that figure will position the blank 150 held in the recess 158 of the blank carrier 156 directly in front of the central die element 60 carried by the die member 56. The resulting position of the feeding member 154 is shown in FIG. 2.

The feeding member 154 is supported in a guide structure 170 secured to the side member 26 of the apparatus by a bracket 172, as shown in FIG. 2. The feeding member 154 is held in position in a guide groove in the guide structure 170 by a cover plate 174. The feeding member 154 is reciprocated by an air cylinder 176 from the position shown in FIGS. 5 and 6 to the position shown in FIG. 2 in which the blank 150 is positioned in front of the central die element 60. The feeding member 154 is also returned to its retracted position shown in FIG. 6 by such air cylinder and by a tension spring 177 connected between the feeding member 154 and the guide structure 170. It will be noted that the feeding member 154 is inclined upwardly from the air cylinder toward the die mechanism such that the blank 150 tends to remain in the recess 158 during the feeding operation.

The central die element 60 upon being reciprocated to the left in FIGS. 1 and 2, is projected through the aperture in the annular blank 150 in the recess 158 in the blank carrier 156. Immediately thereafter the feeding member 154 is withdrawn to the right in FIG. 6 so as to be withdrawn from the path of the die holder 50. If a blank which does not have an aperture therein should happen to be fed, the central die element 60 will merely force the blank 150 out of the recess 158, since the hinged element 160 will open against the action of the spring 164. When the feeding member 154 is moved to the left in FIG. 6 to position the blank 150 in the path of the central die element 60, the rear portion of the blank holder 156 remains below the chute 152 to hold the blanks 150 from being discharged from the chute. Upon the return of the feeding member to the right to the position shown in FIG. 6, another blank 150 enters the recess 158 for the next feeding operation.

The air cylinder 176 which reciprocates the feeding member 154 is controlled by a valve 178 (FIG. 2) mounted upon the side member 26 of the frame of the machine. The valve is of the plunger type and is actuated by a cam member 180 engaging a roller 182 on the plunger of the valve. The cam 180 is mounted upon a laterally extending cam supporting member 184 secured to the piston rod 64 of the hydraulic cylinder 66 which reciprocates the die holder 50 and associated die parts including the central die element 60. The cam supporting member 184 extends through a slot 186 indicated by dotted lines in FIG. 2. The slot 186 serves to guide the cam supporting member 184 and also prevent rotation of the piston rod 64.

When the piston rod 64 is in its retracted position shown in FIG. 2, the cam 180 does not engage the roller 182 of the valve 178. Under these conditions, air is supplied to the cylinder 176 from the air supply tube 187 by the valve 178 through the tube 188 and discharged through the tube 190 to move the feeding member 154 from its retracted position shown in FIGS. 5 and 6 to its feeding position shown in FIG. 2. During the movement of the feeding member 154 from retracted position to the feeding position, air from the tube 190 is exhausted through the valve 178 and an adjustable restricted orifice member 192 so that the travel of the feeding member 154 against the force of the spring can be adjusted so as to be relatively slow as compared to the possible speed of actuation by the cylinder 176. That is to say, the speed of the member 154 is adjusted so that the blank 150 is not projected from the recess 158 when the feeding member 154 reaches the end of its travel.

As soon as the blank is impaled upon the central die element 60, the cam 180 actuates the valve 178 to cause the air cylinder 176 and spring 177 to return the feeding member 154 to its retracted position. During return movement of the feeding member 154, air is supplied to the air cylinder through the tube 190 and air is exhausted from the air cylinder through the pipe 188 and the exhaust connection 194 of the valve 178. Such exhaust connection does not restrict the flow of exhaust air and the air cylinder 176 in conjunction with the spring, shown in FIGS. 5 and 6, rapidly returns the feeding member 154 to remove the feeding portion 156 from the path of the central die elements 60 and die holder 50. After the rivet forming operation has been completed, the cam 180 again clears the roller 182 of the valve 178 to cause the cylinder 176 to return the feeding member 154 to the feeding position shown in FIG. 2. In the case of failure of the compressed air supply to the valve 178 and air cylinder 176, the spring 177 maintains the feeding member 154 in its retracted position such that the extrusion dies of the machine may continue through their extrusion cycle without injury to the feeding mechanism or to the extrusion mechanism.

A control circuit for operating the various cylinders and solenoids for the machine described above is shown in FIG. 17. The supply of hydraulic fluid to extrusion cylinder 66 is controlled by a solenoid actuated four-way valve 196 actuated by a pair of solenoid windings 198 and 200. The solenoid windings 198 and 200 are energized from the lines $L_1$ and $L_2$ under control of switches 202 and 204, respectively, which are in turn actuated by cams 206 and 208, respectively. The cams are driven from a motor 210 through a speed changer 212, the drive from the speed changer to the cams being indicated by the dotted line 214. The supply of hydraulic fluid to the backing member cylinder 118 is controlled by a solenoid actuated four-way valve 216 which is actuated by a pair of solenoid windings 218 and 220 selectively energized from the line $L_1$ and $L_2$ through switches 222 and 224 actuated by cams 226 and 228, respectively, also driven by the motor 210 through the speed changer 212.

The winding 142 of the stop solenoid for the stop member 128 for the piston rod 160 of hydraulic cylinder 118 is selectively energized from the lines $L_1$ and $L_2$ through the switch 230 actuated by a cam 232 also driven by the motor 210 through the speed changer 212. The motor 210 is energized from the lines $L_1$ and $L_2$ through a manually actuatable switch 234 which is in parallel with a switch 236 actuated by the cam 238 driven by the motor 210. Upon closing of the switch 234, the motor 210 rotates to rotate the cams 206, 208, 226, 228, 232 and 238 in the direction indicated by the arrows on the various cams so that the switches associated with such cams are selectively closed by such cams. It will be apparent that the cam 238 will always cause the motor to drive the various cams to the position shown in FIG. 17 whenever the manually actuatable switch 234 is opened so that the machine will always complete a cycle when such switch is opened to stop the machine.

Hydraulic fluid under pressure is supplied to the valve 196 from a tank 240 by a pump 242 through an adjustable flow regulator 244 which sets the maximum rate of flow of fluid to the valve 196 and thus predetermines the maximum speed of the piston rod 64 of the cylinder 66. Fluid discharged through the valve 196 is returned to the tank through the conduit 246. When the winding 198 of the valve 196 is energized, hydraulic fluid is delivered through the conduit 248 and exhausted through the conduit 250 to move the piston rod 64 of the cylinder 66 to the left in FIG. 17. During such movement, the fluid pressure in the cylinder 66 is prevented from exceeding a predetermined pressure by an adjustable pressure regulator 252 connected between the conduit 248 and the return conduit 246. Deenergization of the solenoid winding 198 returns the valve 196 to neutral position and energization of the solenoid winding 200 of the valve 196 supplies fluid under pressure through the conduit 250 and exhausts fluid through the conduit 248 to return the piston rod 64 to the right in FIG. 17.

Hydraulic fluid is supplied to the valve 216 for the forming member cylinder 118 through an adjustable flow regulator 253 similar to the flow regulator 244 and fluid is exhausted from the valve through the conduit 246. Energization of the solenoid winding 218 of the valve 216 actuates the valve to deliver fluid under pressure to the cylinder 118 through the conduit 254 and exhausts fluid from such cylinder through the conduit 256 to drive the piston rod 116 of the cylinder 118 to the right in FIG. 17. The pressure supplied through the conduit 254 to the cylinder 118 is held below a predetermined maximum value by the adjustable pressure regulator 258 connected between the conduit 254 and the return conduit 246. The flow regulators 244 and 260 are of the type which are adjustable but for a given adjustment will limit the flow of fluid therethrough to a constant maximum value substantially independently of the pressure drop across such regulators. Thus the flow regulators 244 and 260 control the speeds with which the piston rods 64 and 116 are moved by their respective cylinders. The pressure regulators 252 and 258 are also of the adjustable type and for a given adjustment the regulator 252 sets the maximum pressure which can be exerted on the piston rod 64 during its movement to the left in in FIGS. 1, 2 and 17. It is also preferable to provide an adjustable pressure regulator 262 between the outlet of the pump 242 and the return conduit 246 to control the maximum pressure which can be supplied to the hydraulic system.

Figure 17:
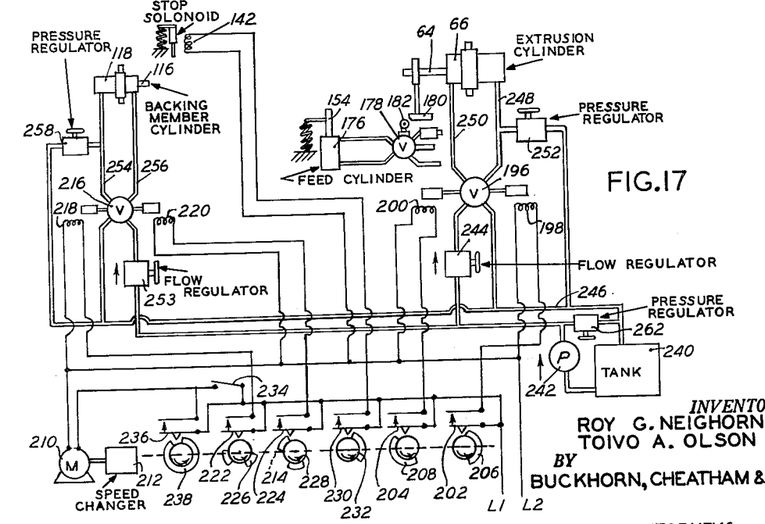
FIG. 17 is a diagrammatic view of a control system for the apparatus of the present invention.

Rotation of cams 206 and 208 first cause the piston rod 64 of the extrusion cylinder to be reciprocated from a retracted position toward the left in FIGS. 1, 2 and 17 to cause the die members 56 and 96 as well as the central die element 60 to perform an extrusion operation and then to be returned to the right to a retracted position. The initial movement of the central die element 60 causes such element to enter the aperture of an annular blank held in the path of such die element by the blank carrier secured to the feeding member 154. As soon as this happns, the cam 180 (FIG. 2) engages the roller 182 of the valve 178 to move the feeding member 154 to its retracted position out of the path of the die holders. In such retracted position, the blank carrier receives another blank from the chute 152 (FIG. 6). During the extrusion stroke of the piston rod 164, the cam 232 causes stop solenoid 142 to position the stop 128 (FIGS. 1 and 4) in the path of the piston rod 116 of the forming member cylinder 118. As soon as the extrusion stroke of the piston rod 164 is completed or substantially completed, the cam 226 of FIG. 17 causes the cylinder 118 to advance its piston rod 116 to the left against the stop 128. The stop 128 determines the position to which the forming member 106 of FIG. 3 is moved to the right in such figure during the rivet forming operation. Such movement of the forming member 106 upsets the extruded end of the rivet immediately after extrusion. As soon as the piston rod 116 of cylinder 118 has completed its stroke its stroke to the right in FIGS. 2 and 3, cams 208 and 226 of FIG. 17 actuate their switches 204 and 224, respectively, to cause the cylinder 66 to retract its piston rod 64 to the right and cause the cylinder 118 to retract its piston rod 116 to the left in FIGS. 1, 2 and 17. This movement of piston rod 116 releases such piston rod from the stop 148. The winding of the stop solenoid has by that time been deenergized by the switch 232 so that the stop 148 is removed from the path of the piston rod 116 by the springs 147. Immediately thereafter the cam 226 again actuates the switch 222 to again cause the cylinder 118 to move its piston rod 116 to the right in FIGS. 1, 2 and 17 to cause the forming member 106 (FIG. 3) to eject the finished rivet. The switch 228 then causes the cylinder 118 to retract its piston rod 116 and forming member 106. When the piston rod 64 of the cylinder 66 reaches its retracted position, the cam 180 clears the roller 182 of the valve 178 to cause another blank feeding operation and the above described cycle is repeated.

Figure 11:
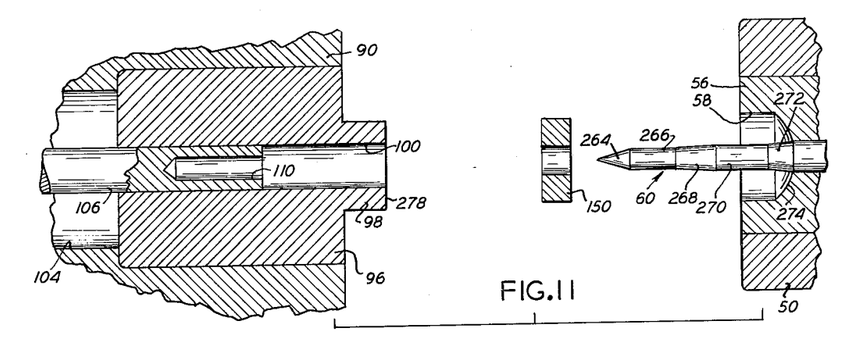
FIG. 11 is a fragmentary longitudinal vertical section on an enlarged scale through the extrusion die members of FIG. 3 showing a blank in position for engagement by the dies, but with the feeding mechanism omitted.

The method of the present invention is most easily explained with reference to FIGS. 11 to 15 of the drawing. As stated above and as indicated in FIG. 11, the blank 150 is positioned in front of the central die element. When the die holder 50 and die member 56 are moved to the left in FIG. 11, the die element 60 enters the aperture in the blank 150 so that the blank is received on the die element 60. Such die element 60 has a pointed end 264 and an adjacent cylindrical portion 266. On the side of the cylindrical portion 266 opposite the point 264, the die element 60 has a tapered or frusto-conical portion 268 and further spaced along the element is another cylindrical portion 270 which is followed by another frusto-conical or tapered portion 272 extending between the cylindrical portion 270 and the end wall 274 of the recess 58 of the die member 56. The diameter of the bore in the blank 150 is approximately the same as the diameter of the cylindrical portion 270, and the external diameter of the blank 150 is approximately the same as the internal diameter of the recess 58.

Figure 12:
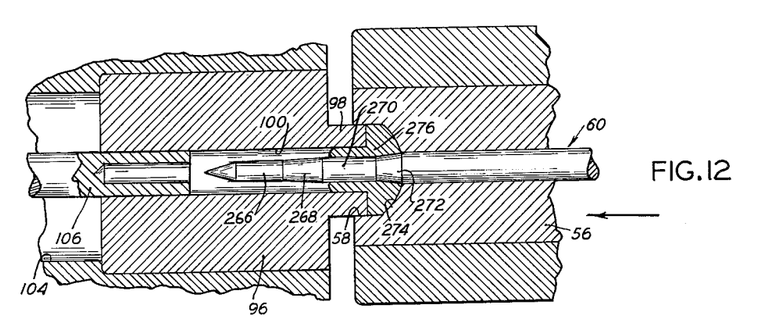
FIG. 12 is a view similar to FIG. 11 showing the position of the dies during an initial portion of the preferred extrusion operation.

As the die holder 50 moves to the left in FIG. 11, the die member 56 and die element 60 reach the position shown in FIG. 12 in which the blank is formed into a partly completed rivet 276. The external side wall of the projection or die plunger 98 fits the internal side wall of the recess 58 and the metal of the blank 150 of FIG. 11 has been compressed within the resulting extruding chamber to cause metal to extrude into the passage 100 in the die member 96 and at the same time cause the metal of the blank to conform to the end wall 274 of the recess 58 and to the end wall of the projection 98 and to conform to the frusto-conical portion 272 of the die element 60 as well as to the cylindrical portion 270 of the die element.

Figure 13:
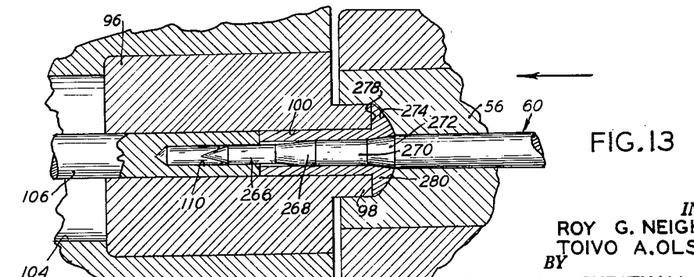
FIG. 13 is a view similar to FIG. 11 showing the position of the forming member when the extrusion has been completed and the forming member has made contact with the extruded metal for an upsetting operation.

Upon further movement of the die member 56 to the left in FIG. 12 to the position shown in FIG. 13, the metal of the blank is further extruded into the more nearly completed rivet 280. Further movement of the die member 56 to the left is prevented by the stop member 74 (FIGS. 1 and 2). At the completion of the extrusion stroke of the die member 56, the extruded end of the rivet has a bore of longer diameter than the cylindrical portion 266 of the central die element. The forming member 106 has moved toward the right in FIG. 13 and is shown in contact with the extruded end of the partly formed rivet. The forming member 106 continues to move to the right to upset the extruded end of the rivet until it is stopped by the completion of the upsetting operation in the position shown in FIG. 14. The stop member 128 shown in FIGS. 1 and 4, has at this time been positioned in the path of the piston rod 116 of the cylinder 118 by the solenoid 134. The stop member 128 is provided primarily for the purpose of preventing the end of the forming member 106 having the bore 110 therein from being jammed upon the tappered portion 268 of the central die member 60. That is to say, the farthest position to which the backing member can be reciprocated to the right in FIG. 14 is determined by the stop 148 of FIGS. 1 and 4 and such distance is set by employing a stop member 148 of appropriate thickness so that upsetting of the extruded end of the rivet can be completed but so that the tapered portion 268 of the central die element 60 will not be jammed into the bore 110 of the forming member 106, if there should be a failure to feed a blank during an extrusion operation.

The upsetting operation is performed immediately after the extrusion operation is completed or may be started even before its completion. In any event, upsetting is accomplished while the metal is still plastic from the extrusion operation and before it has been allowed to cool or otherwise harden by growth of grain structure. The force exerted by the extrusion cylinder 66 on the metal of the rivet is greater than that exerted by the upsetting cylinder 118. The metal in the shank of the completed rivet 282 is compacted by the backing member and forced to conform completely to the interior of the bore 100 and to the die elements 60 while the rivet is held in position by the die member 56. The flow lines of the metal in the rivet extends substantially parallel to the axis of the rivet throughout the shank of the rivet and by employing polished surfaces on the portions of the die members 56 and 96 and on the die element 60 which contact the rivet, the rivet has polished surfaces.

Figure 14:
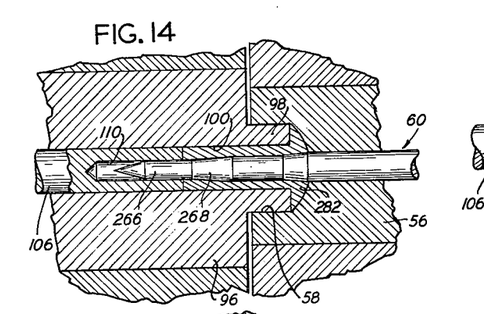
FIG. 14 is a view similar to FIG. 11 showing the position of the dies when the upsetting of the shank of the rivet has been completed.
Figure 15:
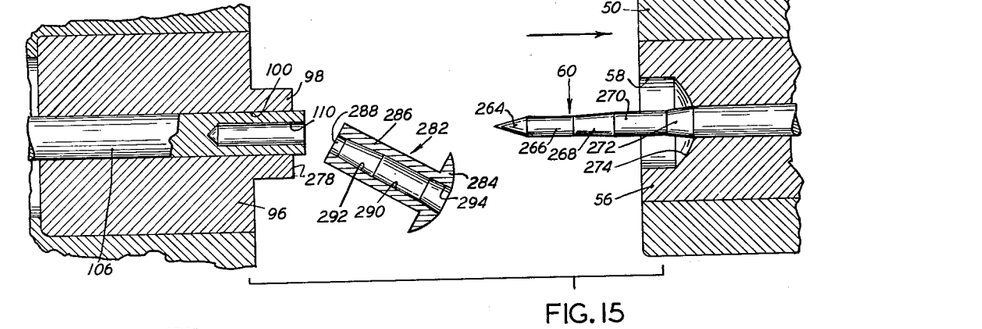
FIG. 15 is a view similar to FIG. 11 illustrating the discharge of the completed rivet.

After the rivet has been completed, the pressure exerted on the rivet by the die members is released and die member 56 is then moved to the right from the position shown in FIG. 14 to the position shown in FIG. 15 to withdraw the die member 56 from contact with the rivet and also to withdraw the central die element 60 from the interior of the rivet. In certain cases it has been found desirable to provide a small amount of play between the trunnions 70 of the cylinder 66, shown in FIG. 2, and their bearing members so that the central die element 60 is abruptly accelerated to the right from its position of FIG. 14 to assist in freeing the die element 60 out from the bore in the rivet 282. As soon as the die member 56 starts to move toward the right from its position in FIG. 14, the forming member 106 is moved by its cylinder 118 to the left in FIG. 14 so that the stop member 128 of FIGS. 1 and 4 may be withdrawn from the path of the piston rod 116 of the cylinder 118. Such stop is then withdrawn by the springs 147 of the solenoid 134 and the forming member 106 is then reciprocated by the cylinder 118 to the right to the position shown in FIG. 15 to eject the completed rivet 282 from the bore 100 in the die member 96. The forming member 106 is then returned to its position shown in FIG. 11 by the cylinder 118. When the central die element 60 reaches its rightmost position in FIG. 15, another blank 150 is positioned to be received upon the die element 60 as illustrated in FIG. 11, for the extrusion of another rivet.

A modified method is also possible. By modifying the timing of the cam 226 of FIG. 17 to cause it to close its switch 222 at an earlier time in the cycle, the piston rod 116 of FIGS. 1 and 2 can be moved against the stop 128 before the extrusion operation of the die member 56 is initiated or at least before it is completed. The timing is such that the forming member 106 reaches a position a short distance to the right of the position of such member in FIG. 14 before the metal being extruded by the die member 56 reaches a position to contact the end of the forming member 106. This means that the metal being extruded pushes the backing member to the left against the pressure in the cylinder 118 so that such metal is directed or upset during the actual extrusion operation. Again the upsetting operation occurs while the metal is plastic from the extrusion operation. Operations intermediate the complete upsetting operation first described and the metal diverting operation just described are also possible. The rest of the rivet forming method, in any event, will be the same as described above.

Figure 9:
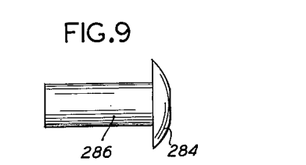
FIG. 9 is a side elevation of one form of rivet produced by the machine of the present invention.
Figure 10:
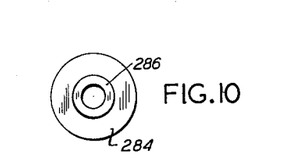
FIG. 10 is an end elevation of such rivet looking toward the right in FIG. 9.

The finished rivet 282, as shown in FIGS. 9, 10 and 15, has a head shape determined by the shape of the end wall 274 of the recess 58 in the die member 56 in conjunction with the end wall 278 of the projection 98 on the die member 96. The shank 286 of the rivet is of uniform external diameter but contains a bore having two cylindrical portions 288 and 290 of different diameter connected by a frusto-conical portion 292, the cylindrical portion 288 being of smaller diameter than the cylindrical portion 290 and being positioned adjacent the end of the shank of the rivet opposite the head 284. Also, the bore in the rivet contains a second frusto-conical portion 294 at the head of the rivet. The rivet made by the present process is employed by inserting such rivet into a bore in members to be riveted together, which bore fits the external diameter of the rivet shank. A headed mandrel is then pulled through the rivet from the shank end toward the head end so as to expand the rivet. The cylindrical portion 288 is of sufficient length to provide a bearing portion for the mandrel head during expansion of the free end of the rivet. The frusto-conical portion 292 enables considerable variation in thickness of the members to be riveted together by a given sized rivet. The cylindrical portion 290 is usually just slightly smaller than the head of the mandrel so that the rivet is expanded tightly into the bore of the members being riveted. The frusto-conical portion 294 provides room for deposition of any metal carried along the bore of the rivet by the head of the mandrel so that such metal does not protrude beyond the head of the rivet. As stated above, the finished rivets are, in general, of bright highly polished metal on all surfaces and have a head and shank portion of compacted metal which is ductile and which does not have to be heat treated in order to enable the rivet to be expanded and which also has excellent mechanical strength.

Figure 16:
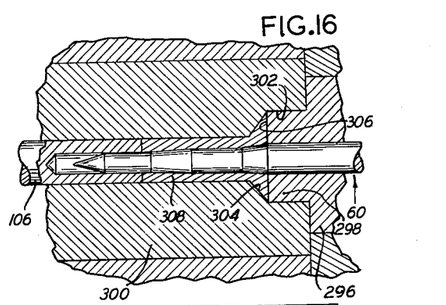
FIG. 16 is a view similar to FIG. 14 showing modified extrusion dies.

FIG. 16 illustrates modified types of die members which can be employed in the present invention. The die member 296, which corresponds to the movable die member 56 of FIG. 14, contains a projection or die plunger 298 which corresponds to the die plunger 98 of the stationary die member 96 of FIG. 14. Similarly, the stationary die member 300 of FIG. 16, which corresponds to the stationary die member 96 of FIG. 14, has a recess 302 therein which receives the die plunger 298 of the die member 96. In other words, there is a reversal of parts as between the stationary and movable die members, the recess being in the stationary die member 300 of FIG. 16 instead of in the movable die member 56 of FIG. 14. Also, the end wall 304 in the recess 302 and the end wall 306 of the die plunger 298 are formed to produce a flat-headed rivet 308 instead of the round-headed rivet 282 of FIG. 14. Otherwise, the die members of FIG. 16 and other elements of the machine may be entirely similar to those described with respect to the other figures of the drawing and the process is the same. It will, of course, be apparent that round-headed rivets may be made with die members of the general type shown in FIG. 16 by suitable modification of the end walls of the recess and projection and that, similarly, flat-headed rivets can be made in the die members of FIG. 14 by suitable modification of the end walls of the recess 58 and projection 98 of FIG. 14. Thus, substantially any shaped head can be produced in either type of die structure.

The operation of the machine of FIGS. 1 to 17 should be clear from the above description of the process. The various members and elements of the machine occupy the positions shown in FIGS. 1, 2, 3, 4, 11 and 17, at the end of the extrusion cycle and before the start of a new cycle. At such time, the feed member 154 occupies the position shown in FIG. 2 of the drawing whenever there is a supply of compressed air to the valve 178. This is also the position of the various parts of the machine when the switch 234 of FIG. 17 has been opened and the cycle has been completed. Upon closing of the switch 234 of FIG. 17, the motor rotates the various cams shown in such figure in a counterclockwise direction. The first thing that happens in the preferred operation is that the switch 202 is closed to energize the winding 198 of the solenoid valve 196. This actuates valve 196 to supply hydraulic fluid through the conduit 248 to the extrusion cylinder 66 and the die member 56 starts its excursion to the left in FIGS. 1, 2 and 11. The blank 150 of FIG. 11 is received upon the die element 60. As soon as this happens, the cam 180 of FIGS. 2 and 17 engages the roller 182 of the air valve 178, such that the feed member 154 is rapidly withdrawn from the path of the die holder 50 and die member 56. When such feed member 154 has been withdrawn from the path of the die holder 50 to the position shown in FIG. 6, another blank 150 drops into the recess 158 in the feed element 156 from the chute 152 ready for the next feeding operation. The feed member 154 is held in a retracted position by the air cylinder 176 and spring 177 until the end of the extrusion cycle.

At substantially the same time that the switch 202 is closed by the cam 206, the switch 230 is closed by the cam 232 to energize the stop solenoid winding 142 to cause the stop member 128 of FIGS. 1 and 4 to be positioned in the path of the piston rod 116 of the cylinder 118. That is to say, the solenoid 134 moves the stop member 128 downwardly in FIGS. 1 and 4.

The die member 56 continues its excursion to the left in FIGS. 1 and 2 from the position shown in FIG. 11 to the position shown in FIG. 13 to complete the extrusion of the rivet. During the latter part of this movement of the die member 56 or at least as soon as such movement is completed, the cam 226 closes the switch 222 to cause the forming member 106 to be moved by the cylinder 118 of FIGS. 1 and 2 from the position shown in FIG. 12 through the position shown in FIG. 13 to that shown in FIG. 14. The position to which the die member 56 moves to the left is determined by the adjustable stop member 76 which is engaged by the ears 72 on the die plunger 48 and such stop member can be employed to make minor adjustments in the length of the rivet being formed. A small change in the thickness of the head of the rivet produces a substantial change in the length of the shank of the rivet. Major changes in the length of rivets of the same diameter can be produced by merely changing the central die element 60 and feeding a rivet blank of different thickness. The stop member 128 prevents the forming member 106 from being jammed on the tapered portion 268 of the central die member 60 if there is a failure to feed a proper sized rivet blank.

When the rivet has been completely formed, the cam 206 disengages itself from the switch 202 to open such switch and deenergize the winding 198 of the solenoid valve 196. Immediately thereafter the cam 208 closes the switch 204 to energize the winding 200 of the solenoid valve 196 and this causes withdrawal of the die member 56 from the position shown in FIG. 14 to the position shown in FIG. 15. At about the same time as or immediately after the withdrawal of the die member 56 is initiated, the cam 226 allows the switch 222 to open to deenergize the winding 218 of the solenoid valve 216 and immediately thereafter the cam 228 closes the switch 224 to energize the winding 220 of the solenoid valve 216. This causes the cylinder 118 to withdraw the forming member 106 to the left in FIG. 14 and by this time the cam 232 has allowed the switch 228 to open to deenergize the winding 142 of the stop solenoid. The stop 128 is then withdrawn by the springs 147 from the path of the piston rod 116 of the cylinder 118. Immediately thereafter, the cam 228 allows the switch 224 to open and the cam 226 closes the switch 222 to reverse the direction of the forming member 106 and cause it to move to the position shown in FIG. 15 to eject the rivet. The cam 226 then allows switch 222 to open and cam 228 closes switch 224 to retract the forming member and continued rotation of the cams bring them to the position shown in FIG. 17. If the switch 234 remains closed, the cycle is repeated. Opening the switch 234 at any time will cause completion of the extrusion cycle and then stopping of the machine.

Figures 18, 19:
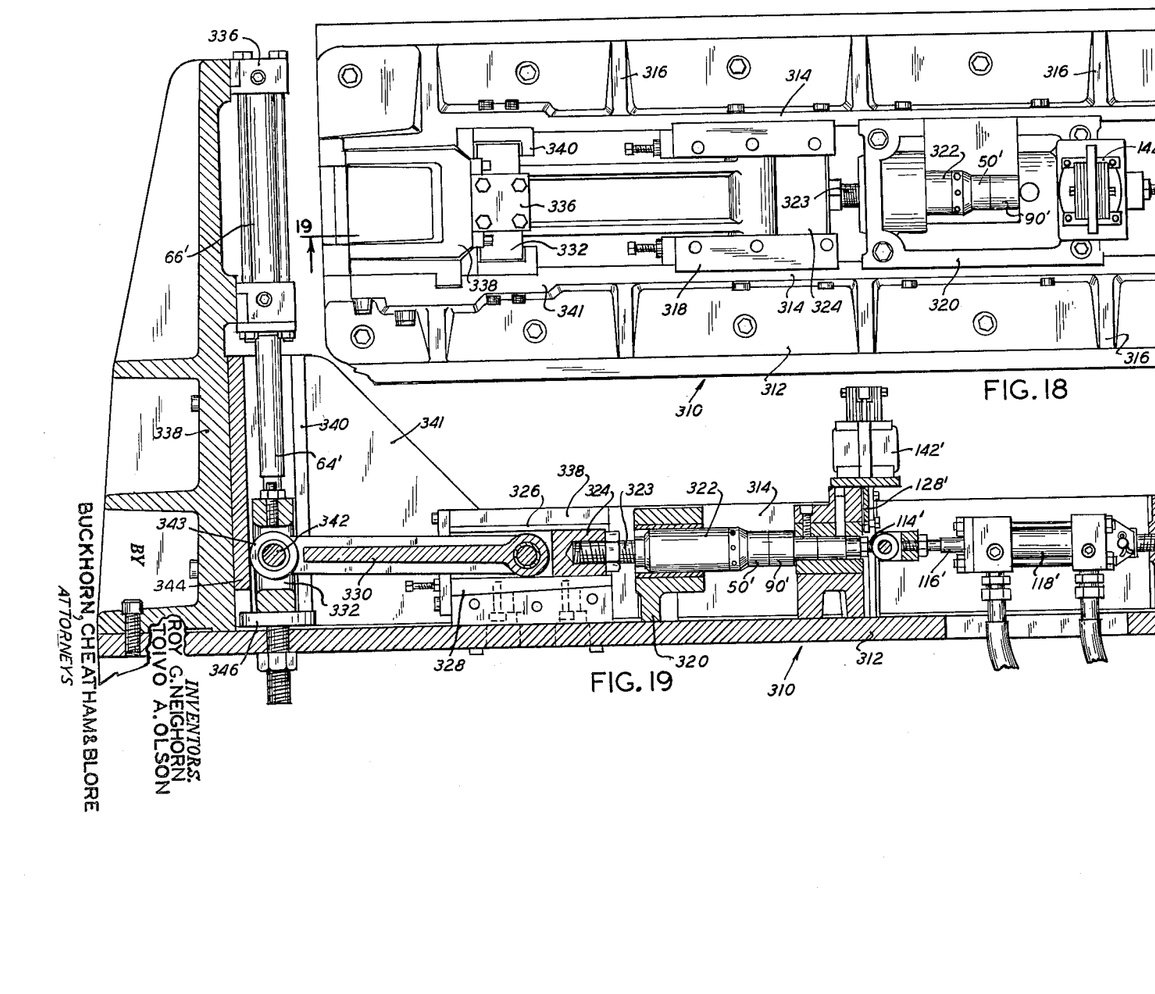
FIG. 18 is a partial plan view of a modified form of apparatus for forming rivets.
FIG. 19 is a vertical section of the apparatus of FIG. 18, taken on the line 19—19 of FIG. 18.

A modified machine in accordance with the present invention is shown in FIGS. 18 and 19. Such machine has a frame 310 including a horizontal base member 312 having laterally spaced longitudinally extending upstanding side portions 314 provided with integral side bracing elements 316. The side portions and the horizontal base member provide a channel for receiving a crosshead guide 318 suitably secured therein and also a U-shaped guide member 320 having a bore therein for guiding a die plunger 322. The die plunger 322 carries a die holder 50' which corresponds to the die holder 50 of FIGS. 1 to 3. It will be understood that the die holder 50' contains die elements, such as the die elements 56 and 60 of FIG. 31.

The die plunger 322 is connected by an adjustable connection 323 to a crosshead 324 reciprocable in the crosshead guide 318, such crosshead guide being provided with suitable upper and lower wearing plates 326 and 328, respectively, the lower one of which is adjustable vertically. The crosshead 324 is reciprocated by a hydraulic cylinder 66' through a toggle connection including a connecting rod 330 extending between the crosshead 324 and a vertically slidable member 332 secured to the end of a piston rod 64' of a hydraulic cylinder 66'. The axis of the cylinder 66' and piston rod 64' extends vertically. The cylinder 66' is supported by a vertically extending supplemental frame member 338 secured to the horizontal base member 312. The vertically sliding member 332 is reciprocable in a guide 340 carried by upwardly extending end portions 341 of the side portions 314 of the frame. The end of the connecting rod 330 connected to the vertically sliding member 332 is journaled on a shaft 342 secured in the member 332 and which also has a pair of rollers 343 journaled thereon and rolling upon a vertical back plate 344 forming part of the guide 340. It will be apparent that reciprocation of the piston rod 64' and sliding member 332 carried thereby in a vertical direction will cause horizontal reciprocation of the crosshead 324 by reason of the connecting rod 330 extending between the crosshead 324 and the sliding member 332.

An adjustable stop 346 is mounted in the horizontal frame member 312 below the vertically sliding member 332 so that the downward motion of the sliding member can be adjustably limited. The adjustable stop 346 in conjunction with the adjustable connection 323 between the crosshead 324 and the die plunger 322 enables the mechanical advantage provided during the latter part of the extrusion stroke of the die plunger 322 by the toggle mechanism just described to be adjusted and also enables adjustment of the position which the die plunger reaches at the end of such stroke.

The toggle arrangement of FIGS. 18 and 19 provides increased mechanical advantage as the extrusion die member approaches the end of its stroke with consequent slowing of the speed of the stroke of the die member as the die member 56 of FIG. 3 approaches the end of its stroke. This action has been found advantageous in the extrusion operation of the present invention in addition to the fact that a smaller cylinder can be employed for the extrusion operation as it slows down the extrusion as such extrusion approaches completion. Also, it has eliminated erratic operation of the machine which has been encountered with a directly coupled hydraulic cylinders of reasonable size, such as the cylinder 66 of FIGS. 1 and 2, unless extreme care is employed to keep air out of the hydraulic system.

The other end portion of the U-shaped guide member 320 supports a second die holder 90' in alignment with the die holder 50' carried by the die plunger 322. It will be understood that the die holder 90' receives and supports a die member, such as the die member 96 of FIG. 3, and that a forming member, such as the forming member 106 of FIG. 3, may be reciprocated therethrough. This reciprocation is accomplished by a hydraulic cylinder 118' (FIGS. 18 and 19) having a piston rod assembly 116' secured to a connecting member 114' corresponding to the connecting member 114 of FIG. 2. The connecting member 114' drives a forming member, such as the backing member 106 of FIG. 3. The cylinder 118' is adjustably secured at its other end to an end member 348 in turn secured to the frame 310.

A stop solenoid 142' reciprocates a stop member 128' in the same manner as the stop solenoid 142 reciprocates the stop member 128 of FIGS. 1, 2 and 4, so as to selectively position the stop member 128' in the path of the connecting rod assembly 116'. The stop member limits the travel of the piston rod assembly 116' and the connecting member 114 secured thereto so as to limit the reciprocation of the forming member 106 (FIG. 3) secured to the connecting member.

Except for the actuation of the die plunger 322 and associated die holder 50' through the toggle mechanism including the connecting rod 330, vertically sliding member 332 and crosshead 324, the machine of FIGS. 18 and 19 operated in the same manner as the machine of FIGS. 1 to 17. The feeding mechanism of FIGS. 1, 2 and 5 to 8 and also the hydraulic and electrical control system of FIG. 17 are entirely applicable thereto.

While we have disclosed the preferred embodiments of our invention, it is to be understood that the details thereof may be varied and that the scope of the invention is to be determined by the following claim.

We claim:

Apparatus for making rivets having a shank with a head at one end and a bore extending therethrough, said apparatus comprising a die member having a cylindrical recess therein, said recess having an internal diameter equal to the diameter of said head and an end wall, a die member having a cylindrical plunger fitting said recess and having an end wall, a central die element extending concentrically of said recess from said end wall of one of said die members and having an external surface conforming to the internal surface of said bore, a cylindrical passage extending concentrically through said end wall of the other of said die members in alignment with said element and having an internal diameter equal to the external diameter of said shank, feeding means to position an annular blank of extrudable metal on said central element, first hydraulic fluid means to force said one member toward said other member to position said central element in said passage to provide an annular passage surrounding said central element to compress said blank by said plunger in said recess and extrude metal from said blank into said annular passage, adjustable stop means to limit the travel of said one member toward the other, a forming member having an annular portion positioned in and fitting said annular passage at a position spaced for said recess to engage the metal being extruded, said central element having a reduced portion at said position, second hydraulic fluid means for moving said forming member toward said one member to cause the extruded metal to conform to said reduced portion of said element, retractible stop means for limiting the movement of said forming member toward said one member, said one member being retractible by said first hydraulic means, and means to selectively retract said retractible stop means to enable said second hydraulic fluid means to move said forming member toward said first member to discharge the extruded rivet from said passage.

References Cited in the file of this patent

UNITED STATES PATENTS

| | | |
|---|---|---|
| 1,797,702 | St. Pierre | Mar. 24, 1931 |
| 2,068,076 | Rosenberg | Jan. 19, 1937 |
| 2,320,862 | Goodman | June 1, 1943 |
| 2,395,722 | Buchet | Feb. 26, 1946 |
| 2,583,270 | Lynall | Jan. 22, 1952 |
| 2,751,809 | Barker | June 26, 1956 |
| 2,753,994 | Bridge | July 10, 1956 |
| 2,898,788 | Baxa | Aug. 11, 1959 |

FOREIGN PATENTS

| | | |
|---|---|---|
| 673,757 | Great Britain | June 11, 1952 |

UNITED STATES PATENT OFFICE
CERTIFICATE OF CORRECTION

Patent No. 3,048,861                                August 14, 1962

Roy G. Neighorn et al.

It is hereby certified that error appears in the above numbered patent requiring correction and that the said Letters Patent should read as corrected below.

Column 1, line 10, for "holow" read -- hollow --; column 4, line 74, for "reces" read -- recess --; column 6, line 27, before "block" insert -- die --; line 32, for "Thank" read -- The --; column 8, line 30, for "uressure" read -- pressure --; line 73, strike out "in"; column 9, line 14, for "happns" read -- happens --; column 10, line 31, for "tappered" read -- tapered --; column 14, line 36, for "backing" read -- forming --; column 15, line 10, for "for" read -- from --.

Signed and sealed this 25th day of December 1962.

(SEAL)
Attest:

ERNEST W. SWIDER                            DAVID L. LADD
Attesting Officer                              Commissioner of Patents